United States Patent

Blanchet

(10) Patent No.: US 9,186,624 B2
(45) Date of Patent: Nov. 17, 2015

(54) METHODS OF PRODUCING AND PROVIDING PURIFIED GAS USING AN ELECTROCHEMICAL CELL

(71) Applicant: Nuvera Fuel Cells, Inc., Billerica, MA (US)

(72) Inventor: Scott Blanchet, Chelmsford, MA (US)

(73) Assignee: NUVERA FUEL CELLS, INC., Billerica, MA (US)

( * ) Notice: Subject to any disclaimer, the term of this patent is extended or adjusted under 35 U.S.C. 154(b) by 0 days.

(21) Appl. No.: 13/972,715

(22) Filed: Aug. 21, 2013

(65) Prior Publication Data

US 2015/0001091 A1    Jan. 1, 2015

Related U.S. Application Data

(60) Provisional application No. 61/840,843, filed on Jun. 28, 2013.

(51) Int. Cl.
   *C25B 1/02*    (2006.01)
   *B01D 53/32*   (2006.01)
   *C01B 3/50*    (2006.01)

(52) U.S. Cl.
   CPC ............... *B01D 53/326* (2013.01); *C01B 3/50* (2013.01); *C01B 3/501* (2013.01); *C25B 1/02* (2013.01)

(58) Field of Classification Search
   CPC ................................ C25B 1/02; B01D 53/326
   USPC ........................................................ 205/637
   See application file for complete search history.

(56) References Cited

U.S. PATENT DOCUMENTS

| 4,620,914 | A | 11/1986 | Abens et al. |
| 6,168,705 | B1 | 1/2001 | Molter et al. |
| 7,601,207 | B2 | 10/2009 | Moulthrop et al. |
| 7,686,937 | B2 | 3/2010 | Ballantine et al. |
| 7,955,491 | B2 | 6/2011 | Ballantine et al. |
| 2005/0145505 | A1* | 7/2005 | Fairlie et al. .................. 205/637 |
| 2006/0028178 | A1* | 2/2006 | Hobbs ........................... 320/128 |

(Continued)

FOREIGN PATENT DOCUMENTS

WO    WO 03075379 A3 *    11/2003

OTHER PUBLICATIONS

Inc.com, "Warranties" Available from http://web.archive.org/web/20100922152058/http://www.inc.com/encyclopedia/warranties.html, Sep. 20, 2010.*
http://web.archive.org/web/20120111150113/http://en.wikipedia.org/wiki/Warranty, Jan. 11, 2012.*
http://www.nist.gov/pml/wmd/pubs/upload/hb130-13-final.pdf, avaiable 2012 at the 97th National Conference on Weights and Measures.*

(Continued)

*Primary Examiner* — Nicholas A Smith
(74) *Attorney, Agent, or Firm* — Finnegan, Henderson, Farabow, Garrett & Dunner, LLP

(57) ABSTRACT

In accordance with one embodiment, a method of producing hydrogen gas meeting a predetermined threshold of purity may include transferring a quantity of a hydrogen gas mixture through an electrochemical hydrogen pump, wherein the electrochemical hydrogen pump includes an anode, a cathode, and an electrolyte membrane located between the anode and the cathode; separating a quantity of hydrogen gas from the hydrogen gas mixture by transferring the hydrogen gas from the anode, through the electrolyte membrane, to the cathode; collecting the hydrogen gas from the cathode, wherein the collected hydrogen gas at least meets the predetermined threshold of purity; and producing a certificate that the collected hydrogen gas has a purity that is at least substantially equal to the predetermined threshold of purity.

32 Claims, 7 Drawing Sheets

(56) References Cited

U.S. PATENT DOCUMENTS

2006/0233701 A1 10/2006 Parias et al.
2007/0246363 A1* 10/2007 Eisman et al. ............... 204/520
2007/0246373 A1 10/2007 Ludlow et al.
2011/0233072 A1 9/2011 Deptala et al.

OTHER PUBLICATIONS http://www.hydrogen.energy.gov/pdfs/review12/st006_van_hassel_2012_o.pdf, available May 15, 2012.*

* cited by examiner

METHODS OF PRODUCING AND PROVIDING PURIFIED GAS USING AN ELECTROCHEMICAL CELL

This patent application claims the benefit of priority under 35 U.S.C. §120 to U.S. Provisional Application No. 61/840,843, filed on Jun. 28, 2013, the entirety of which is incorporated herein by reference.

Embodiments of the present disclosure relate to electrochemical cells, and more particularly, to methods of utilizing electrochemical cells for gas purification, monitoring, and/or for providing purified gas.

Hydrogen has emerged as a viable alternative to traditional power sources, such as fossil fuels, for a range of technologies, including, for example, transportation vehicles, portable power supplies, and stationary power production. Successful commercialization of hydrogen as an energy carrier and the long-term sustainability of a "hydrogen economy" may depend in part on the efficiency and cost-effectiveness of hydrogen manipulation and management systems (e.g., EHCs), and hydrogen distribution systems (e.g., dispensing stations).

Users of hydrogen gas may be sensitive to potential pollutants that may exist in the gas, such as CO, $CO_2$, $N_2$, He, Ar, $O_2$, $CH_4$, higher hydrocarbons, S, Cl, Br, Hg, VOCs, $H_2O$, HCHO, HCOOH, $NH_3$, halogenated compounds, and particulates, for example. Accordingly, consumers may require suppliers to provide purified hydrogen gas, and in some circumstances, to meet or exceed a certain threshold of purity of hydrogen gas supplied. Suppliers and distributors of hydrogen gas generally guarantee the purity of hydrogen supplied by analyzing the composition of the hydrogen gas prior to delivery, using, for example, devices such as gas chromatographs, mass spectrometers, ionization detectors, and infrared spectrometers. Based on analytical measurement of the gas composition recorded using such devices, suppliers may then provide consumers with a certificate of analysis for these, or other compounds, for the supply of hydrogen gas. While such analysis methods may be useful for quality control at centralized hydrogen production facilities to ensure hydrogen purity, such methods may be prohibitively expensive for use at hydrogen fueling stations or hydrogen transfer stations, for example. There is, however, a potential for hydrogen produced at a centralized facility to become polluted during transport to the point of use. Accordingly, a cost-effective method is needed for purifying hydrogen gas, monitoring the purity of hydrogen gas, and ensuring a threshold level of purity of the hydrogen gas delivered by a supplier to a customer. Also, cost-effective quality control and monitoring may be needed for hydrogen production systems, such as natural gas steam-methane reformers and electrolyzers, for example. Embodiments of the present disclosure may set out to solve one or more of the above problems.

In accordance with one embodiment, a method of producing hydrogen gas meeting a predetermined threshold of purity may comprise transferring a quantity of a hydrogen gas mixture through an electrochemical hydrogen pump, wherein the electrochemical hydrogen pump includes an anode, a cathode, and an electrolyte membrane located between the anode and the cathode; separating a quantity of hydrogen gas from the hydrogen gas mixture by transferring the hydrogen gas from the anode, through the electrolyte membrane, to the cathode; collecting the hydrogen gas from the cathode, wherein the collected hydrogen gas at least meets the predetermined threshold of purity; and producing a certificate that the collected hydrogen gas has a purity that is at least substantially equal to the predetermined threshold of purity.

Various embodiments of the disclosure may include one or more of the following aspects: the method may further comprise removing from the anode a quantity of non-hydrogen gas from the hydrogen gas mixture that the electrolyte membrane blocks from passing through the electrolyte membrane to the cathode; the method may further comprise delivering the collected hydrogen gas to a consumer; the predetermined threshold of purity may be above approximately 99% hydrogen; the predetermined threshold of purity may be less than approximately 300 parts per million of non-hydrogen gas; and the predetermined threshold of purity may be less than approximately 50 parts per million of non-hydrogen gas.

In another embodiment of the disclosure, a method of providing hydrogen gas meeting a predetermined threshold of purity may comprise introducing a quantity of hydrogen gas mixture containing hydrogen gas and non-hydrogen gas to an electrochemical hydrogen pump, wherein the electrochemical hydrogen pump includes an anode, a cathode, and an electrolyte membrane located between the anode and the cathode; directing the hydrogen gas mixture from the anode to the electrolyte membrane; passing the hydrogen gas through the electrolyte membrane to the cathode; substantially preventing the non-hydrogen gas from passing through the electrolyte membrane; collecting the hydrogen gas from the cathode, wherein the collected hydrogen gas at least meets the predetermined threshold of purity; and mixing the collected hydrogen gas with a second quantity of hydrogen gas mixture, wherein the mixing produces a third quantity of hydrogen gas mixture with a level of purity that at least meets the predetermined threshold of purity.

Various embodiments of the disclosure may include one or more of the following aspects: the method may further comprise providing a warranty that the third quantity of hydrogen gas mixture has a purity that is at least substantially equal to the predetermined threshold of purity; the method may further comprise delivering the third quantity of hydrogen gas to a consumer; the first quantity of hydrogen gas mixture and the second quantity of hydrogen gas mixture may be both initially derived from a hydrogen gas mixture source, and the first quantity, and the second quantity may be separated when the first quantity is introduced to the electrochemical hydrogen pump, and the first quantity and the second quantity may be rejoined by the mixing; the collected hydrogen gas may be mixed with the second quantity of hydrogen gas mixture, and the non-hydrogen gas substantially prevented from passing through the electrolyte membrane may not be mixed with the second quantity of hydrogen gas mixture; the collected hydrogen gas mixed with the second quantity of hydrogen gas mixture may be delivered to a consumer; the predetermined threshold of purity may be above approximately 99% hydrogen; the electrochemical hydrogen pump may be configured to operate at a pressure of above approximately 2,000 psi; the electrochemical hydrogen pump may be configured to operate at a pressure of above approximately 5,000 psi; and the electrochemical hydrogen pump may be configured to operate at a pressure of above approximately 10,000 psi.

In another embodiment, a method of providing hydrogen gas meeting a predetermined threshold of purity may comprise providing a quantity of hydrogen gas; diverting a first portion of the quantity of hydrogen gas to an electrochemical hydrogen pump, wherein the electrochemical hydrogen pump includes an anode, a cathode, and an electrolyte membrane located between the anode and the cathode; directing the first portion of hydrogen gas from the anode, to the electrolyte membrane; passing the first portion of hydrogen gas through the electrolyte membrane to the cathode; substantially preventing non-hydrogen gas in the first portion from passing through the electrolyte membrane; and reintroducing the first portion of hydrogen gas passed through the electrolyte membrane to a second portion of hydrogen gas not diverted to the electrochemical hydrogen pump.

Various embodiments of the disclosure may include one or more of the following aspects: a voltage required to operate the electrochemical hydrogen pump may increase as the amount of non-hydrogen gas substantially prevented from passing through the electrolyte membrane increases; the increase in voltage may be a function of the amount of non-hydrogen gas substantially prevented from passing through the electrolyte membrane, and the electrochemical hydrogen pump may be calibrated to detect whether the first portion of hydrogen gas diverted to the electrochemical hydrogen pump falls below the predetermined level of purity; the method may further comprise delivering the first portion of hydrogen gas passed through the electrolyte membrane and the second portion of hydrogen gas not diverted to the electrochemical hydrogen pump to a consumer; the electrochemical hydrogen pump may further include a controller and the method may further comprise stopping the delivery of the first portion of hydrogen gas to the consumer if the controller detects that the hydrogen gas diverted to the electrochemical hydrogen pump falls below a predetermined level of purity; the method may further comprise producing a warranty that the hydrogen gas delivered to the consumer has a purity that is at least substantially equal to the predetermined threshold of purity; the method may include sending an amount of the first portion of the quantity of hydrogen gas to a measurement device, wherein the measurement device is configured to measure a purity level of the hydrogen gas; the amount of the first portion may be sent from the anode of the electrochemical hydrogen pump to the measurement device; the electrochemical hydrogen pump may be configured to operate at a pressure of above approximately 2,000 psi; the electrochemical hydrogen pump may be configured to operate at a pressure of above approximately 5,000 psi; and the electrochemical hydrogen pump may be configured to operate at a pressure of above approximately 10,000 psi.

In another exemplary embodiment, a method of providing hydrogen gas meeting a predetermined threshold of purity may comprise introducing a quantity of hydrogen gas mixture containing hydrogen gas and non-hydrogen gas to an electrochemical hydrogen pump, wherein the electrochemical hydrogen pump includes an anode, a cathode, and an electrolyte membrane located between the anode and the cathode; directing the hydrogen gas mixture from the anode to the electrolyte membrane; passing the hydrogen gas through the electrolyte membrane to the cathode; substantially preventing the non-hydrogen gas from passing through the electrolyte membrane; collecting the hydrogen gas from the cathode, wherein the collected hydrogen gas at least meets the predetermined threshold of purity; and providing a warranty that the collected hydrogen gas has a purity that is at least substantially equal to the predetermined threshold of purity.

Various embodiments of the disclosure may include one or more of the following aspects: the electrochemical hydrogen pump may be configured to operate at a pressure of above approximately 5,000 psi; and the electrochemical hydrogen pump may be configured to operate at a pressure of above approximately 10,000 psi.

Additional objects and advantages of the embodiments will be set forth in part in the description that follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure, and together with the description, serve to explain the principles of the disclosure.

Reference will now be made in detail to the exemplary embodiments of the present disclosure described below and illustrated in the accompanying drawings. Wherever possible, the same reference numbers will be used throughout the drawings to refer to same or like parts.

Figure 1:
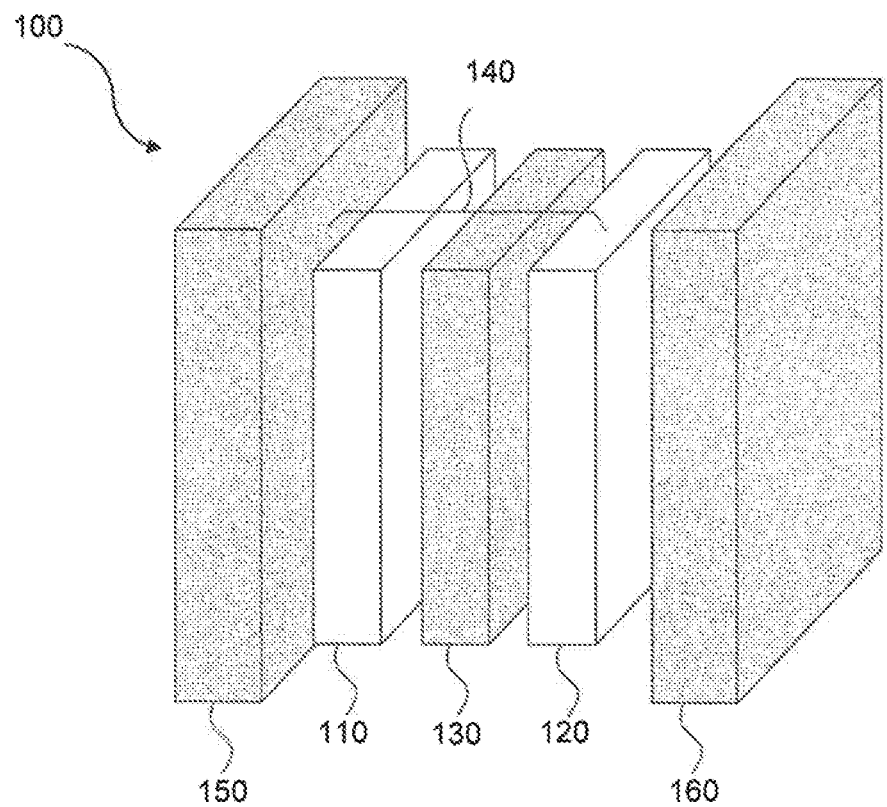
FIG. 1 illustrates an exploded view of an exemplary electrochemical cell, according to an embodiment of the present disclosure.

While the present disclosure is described herein with reference to illustrative embodiments of an electrochemical hydrogen pump, it is understood that the devices and methods of the present disclosure may be employed with various types of electrochemical cells, including, but not limited to, any suitable hydrogen compressors, fuel cells, electrolysis cells, hydrogen purifiers, and hydrogen expanders. Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Electrochemical cells are devices typically used for generating current from chemical reactions or inducing a chemical reaction using a flow of current. A fuel cell converts the chemical energy of a fuel (e.g., hydrogen, natural gas, methanol, gasoline, etc.) and an oxidant (e.g., air or oxygen) into electricity and produces heat and water. A basic electrochemical cell comprises a negatively charged anode, a positively charged cathode, and an ion-conducting material called an electrolyte.

An electrolysis cell is essentially a fuel cell operating in reverse. A basic electrolysis cell can function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion.

An electrochemical hydrogen compressor (EHC), for example, can be used to selectively transfer hydrogen from one side of a cell to another. EHCs operating in this manner are sometimes referred to as electrochemical hydrogen pumps (EHP), and the terms EHP and EHC may be used interchangeably for the purpose of this disclosure. When the hydrogen accumulated at the second electrode is restricted to a confined space, the electrochemical cell compresses the hydrogen or raises the pressure within the confined space. The maximum pressure or flow rate an individual cell is capable of producing can be limited based on the cell design. In some embodiments, suitable EHCs may operate at higher pressures, for example, above approximately 2,000 psi, above approximately 5,000 psi, or above approximately 10,000 psi.

In an exemplary embodiment, a method for monitoring and ensuring hydrogen purity may include the use of an EHP or an EHC. As discussed above, these devices employ a proton conducting membrane as part of the electrochemical cells, and the membrane may allow only protons (i.e. hydrogen ions) and water to pass through. By only allowing hydrogen ions and water to pass through, other compounds may be physically prevented from passing through the membrane. Accordingly, hydrogen gas suppliers may be able to use this technology to remove pollutants from hydrogen gas, to monitor the presence of pollutants in hydrogen gas, and thus to ensure a certain level of purity of hydrogen gas supplied to the consumer. As used herein, "hydrogen gas" may include hydrogen meeting a predetermined threshold of purity (purified hydrogen gas), hydrogen gas mixed with a quantity of impurities, or hydrogen gas suspected of, or potentially mixed with, a quantity of impurities. Further, "hydrogen gas mixture" may include hydrogen gas mixed with a quantity of impurities, or hydrogen gas suspected of or potentially mixed with a quantity of impurities. "Pollutants" may include any non-hydrogen gas, liquid, or solid.

FIG. 1 depicts an exploded side view of an electrochemical cell 100, according to an exemplary embodiment of the present disclosure. Electrochemical cell 100 includes an anode 110, a cathode 120, and an electrolyte membrane 130 disposed between anode 110 and cathode 120. Together, electrolyte membrane 130, anode 110, and cathode 120 may form a membrane electrode assembly (MEA) 140.

Electrolyte membrane 130 may electrically insulate anode 110 from cathode 120. Electrolyte membrane 130 may be any suitable membrane, including, e.g., a proton exchange membrane (PEM). Electrolyte membrane 130 may be formed of a pure polymer membrane or a composite membrane, which may include, e.g., silica, heteropolyacids, layered metal phosphates, phosphates, and zirconium phosphates, embedded in a polymer matrix. Electrolyte membrane 130 may be permeable to protons but may not conduct electrons. Anode 110 and cathode 120 may include porous carbon electrodes containing a catalyst. The catalyst material, e.g., platinum or any other suitable material, may speed up the reaction of oxygen and hydrogen.

Electrochemical cell 100 may further comprise two bipolar plates 150, 160. Bipolar plates 150, 160 may act as support plates, conductors, provide passages to the respective electrode surfaces for the hydrogen, and provide passages for the removal of the compressed hydrogen. Bipolar plates 150, 160 may also include access channels for cooling fluid (i.e., water, glycol, or water glycol mixture). The bipolar plates may be made from aluminum, steel, stainless steel, titanium, copper, Ni—Cr alloy, graphite or any other electrically conductive material or combination of materials. Bipolar plates 150, 160 may separate electrochemical cell 100 from the neighboring cells in an electrochemical stack (not shown). For example, multiple electrochemical cells 100 may be linked in series to form a multi-stage EHC or stacked in parallel to form a single-stage EHC.

In operation, according to an exemplary embodiment, hydrogen gas may be supplied to anode 110 through bipolar plate 150. An electric potential may be applied between anode 110 and cathode 120, wherein the potential at anode 110 is greater than the potential at cathode 120. The hydrogen at anode 110 may be oxidized, causing the hydrogen to split into electrons and protons. The hydrogen protons may then be electrochemically transported or "pumped" through PEM 130 to cathode 120, while the electrons are rerouted around PEM 130. At cathode 120, the transported protons and rerouted electrons are reduced to form hydrogen. As more and more hydrogen is formed at cathode 120, the hydrogen may be compressed and pressurized within a confined space.

Thus, as described above, an EHP or EHC may employ a proton conducting membrane as part of an electrochemical cell, which may allow only hydrogen ions and water to pass through. Other compounds, e.g., pollutants, may be physically prevented from passing through the membrane. Accordingly, this technology may be used to purify hydrogen. Likewise, by using electrochemical cell technology, hydrogen suppliers may be able to ensure the purity of the hydrogen gas supplied, and suppliers or consumers may be able to monitor a supply of hydrogen gas for pollutants.

Figure 2A:
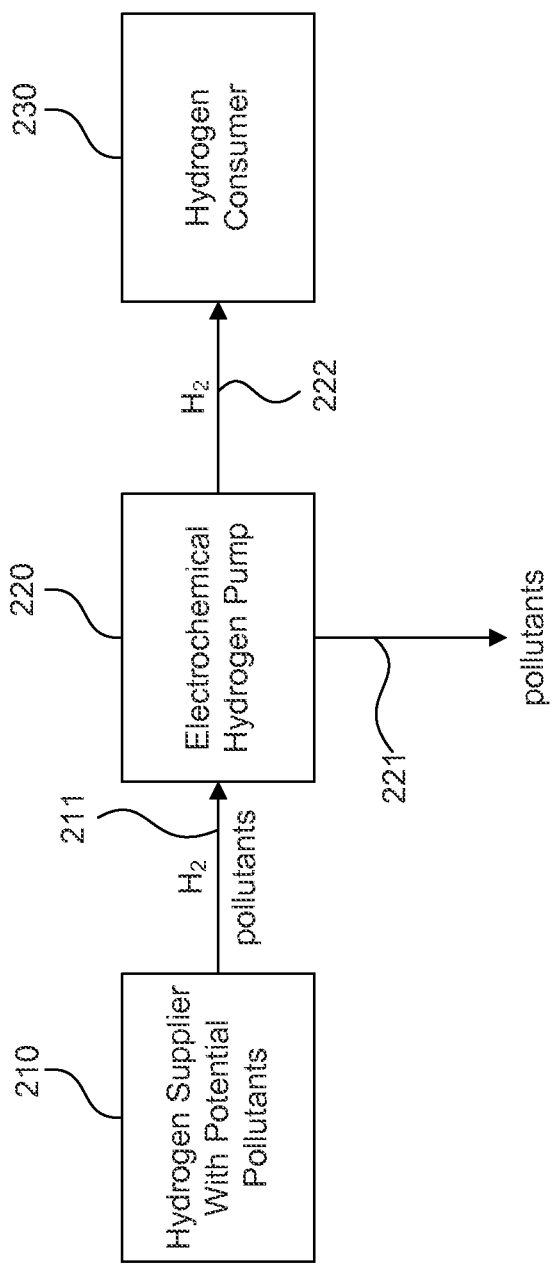
FIG. 2A illustrates an exemplary purification method, according to an embodiment of the present disclosure.

In an exemplary embodiment, an EHP or EHC may be used to purify hydrogen gas. As is shown in FIG. 2A, a hydrogen supplier 210 may generate a quantity of hydrogen gas, which may contain one or more pollutants. The supply of hydrogen gas may be generated, for example, using any suitable steam-methane reformer, fossil hydrocarbon reformer, renewable hydrocarbon reformer, electrolyzer, ethanol reformer, biomass reformer, coal gasification, nuclear-powered water splitting, photoelectrochemical systems, photobiological systems, or solar thermochemical systems. In some embodiments, supplier 210 may already have a quantity of hydrogen gas or hydrogen liquid contained in any suitable container, for example, a tube, tank, pipeline, or bottle, and this hydrogen may have an unknown, suspected, or known admixture of pollutants.

Figure 2B:
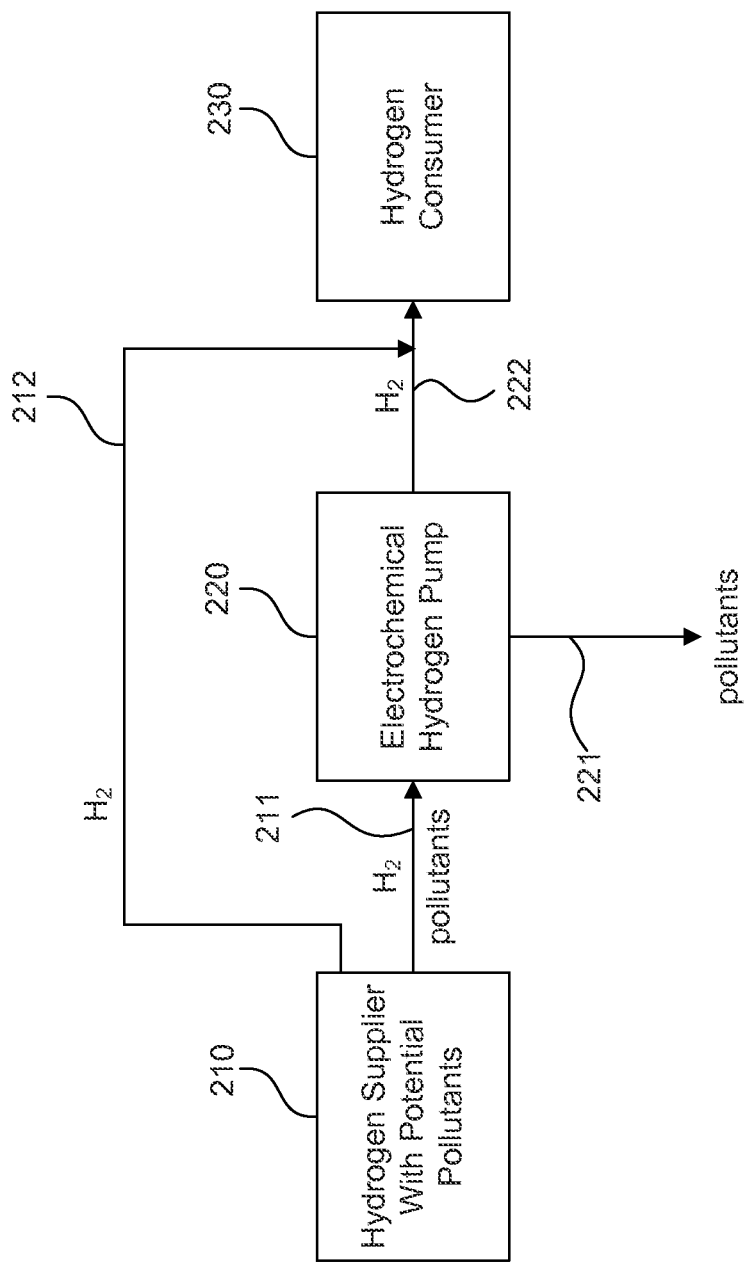
FIG. 2B illustrates an exemplary purification method, according to an embodiment of the present disclosure.

To ensure purity of the hydrogen gas supplied to a consumer, the admixture of hydrogen gas and potential pollutants may be passed through an EHP 220, step 211. The gas admixture may be passed through EHP 220 at any point following production, for example, immediately after production or after a period of storage time. As discussed above, EHP 220 includes an electrolyte membrane and is configured to allow only protons, i.e., hydrogen ions, and water molecules to pass through. Accordingly, only hydrogen and water will be allowed to pass through from the anode side of EHP 220 to the cathode side of EHP 220. Pollutants present in the gas admixture will be separated out and removed from EHP 220, step 221. While the exemplary embodiments in FIGS. 2A, 2B show only one EHP 220, any suitable number of EHPs may be included. For example, a plurality of EHPs could be arranged in parallel or in series. Additionally, each EHP may include an individual electrochemical cell or a plurality of electrochemical cells arranged in a stack.

As is shown in step 222, the purified hydrogen collected at the cathode side of EHP 220 may be delivered to a hydrogen consumer 230. The hydrogen gas may be delivered to consumer 230 at any point following purification, for example, immediately after purification or after a period of storage time, though reducing the time between purification and delivery may reduce the likelihood of recontamination. Consumer 230 may use the delivered hydrogen for any suitable use, including, e.g., for dispensing to fuel cell vehicles (e.g., at fueling or transfer stations), use with fuel cell vehicles, use with stationary fuel cell applications (e.g., back-up generators, home power systems), portable fuel cell applications, manufacturing (e.g., of semiconductors, electronics, metallurgy), or other commodity hydrogen gas users (e.g., laboratories, chemical synthesis). Suppliers of hydrogen gas 210 may include mass-producers and wholesale distributors who supply to retail distributors (e.g., fueling or transfer stations), industrial and commodity manufacturers or users, or individual users of hydrogen. Consumers 230 of hydrogen gas may include refineries of both fossil and renewable hydrocarbon fuels, retail distributors, e.g., fueling stations, industrial manufacturers or users, or individual users of hydrogen. In some embodiments, suppliers 210 and consumers 230 may be the same entity, for example, a retailer or manufacturer may produce its own hydrogen gas for its own consumption.

Further, as is shown in FIG. 2B, in some embodiments, a portion of hydrogen may bypass EHP 220 instead of passing through EHP 220 at step 211. For example, a portion of hydrogen may follow step 212 and may pass straight from hydrogen supplier 210 to hydrogen consumer 230. In such an example, a quantity of hydrogen from supplier 210 may be broken into at least two portions, one that follows step 211 through EHP 220, and one that follows step 212, bypassing EHP 220. The two portions of hydrogen may be rejoined at step 222 before reaching consumer 230. In some embodiments, the portion of hydrogen that follows step 212 may be smaller than the portion of hydrogen that follows step 211, while in some embodiments, the portion of hydrogen that follows step 212 may be substantially equal to or greater than the portion of hydrogen that follows step 211. In some embodiments, the amount of hydrogen directed towards step 211 and/or 212 may vary over time, for example, the amount may be adjusted manually or automatically over time. For example, in some embodiments, the size of each portion may vary in response to a measured parameter of the system (e.g., voltage, consumption, age, efficiency), or of the fluids passing through EHP 220 (e.g., content, pressure, temperature, flow rate, etc.), or in response to a characteristic of the supplier or of the consumer (e.g., consumer needs, etc.). In some embodiments, the method of FIG. 2B may be adjusted to resemble the method of FIG. 2A for a period of time and no hydrogen may be directed towards step 212.

In some embodiments, the method of FIG. 2B may provide an alternate method of purification. Hydrogen supplier 210 may purify the portion of hydrogen gas passed through EHP 220, as described in relation to FIG. 2A. When the purified hydrogen passed through EHP 220 is remixed at step 222 with the portion of hydrogen that bypassed EHP 220, the mixing of the portions of hydrogen gas may result in hydrogen gas that meets a threshold level of purity.

In some embodiments, supplier of hydrogen gas 210 may use the above purification methods of FIGS. 2A, 2B in order to ensure that the hydrogen gas delivered to consumer 230 meets a predetermined threshold of purity. Such a threshold may be set by an industry standard, e.g., CGA-5.3, SAE J2719 and ISO 14687-2, or may be dictated at least in part by the needs of consumer 230, for example. Hydrogen purity levels may exceed 99% purity, and in some instances, may exceed 99.9% purity. Total impurities may be less than 400 parts per million, and in some instances, may be less than 100 or less than 10 parts per million.

In some embodiments, supplier 210 may use EHP 220 for hydrogen purification as a method of making certain guarantees or warranties, e.g., through contractual agreements or certificates, to consumer 230 about the purity level of the delivered hydrogen. As used herein, a warranty may include any express, implied, written, oral, contingent, limited, full, or other suitable warranty. As used herein, a certificate may include a certification of conformance, compliance, conformity, analysis, accuracy, or any other suitable certification or combination thereof. Such certificates may certify or guarantee any suitable parameter, measurement, property, or quality (e.g., specialty or industrial) of a gas, for example, content (e.g., gas, moisture, or particle), certainty of composition, integrity, complexity, purity level, compliance with one or more standards or specifications. Further, the certificate could certify the method of blending, type of laboratory analysis and reference standard used to prepare the gas mixture, and expiration date, for example. Accordingly, the method of using an EHP to purify a quantity of hydrogen gas may provide supplier 210 with a cost-effective method of, e.g., contractually guaranteeing the purity of hydrogen gas delivered by supplier 210 to consumer 230, or of producing and providing a supply of hydrogen gas that meets a predetermined threshold of purity.

Figure 3A:
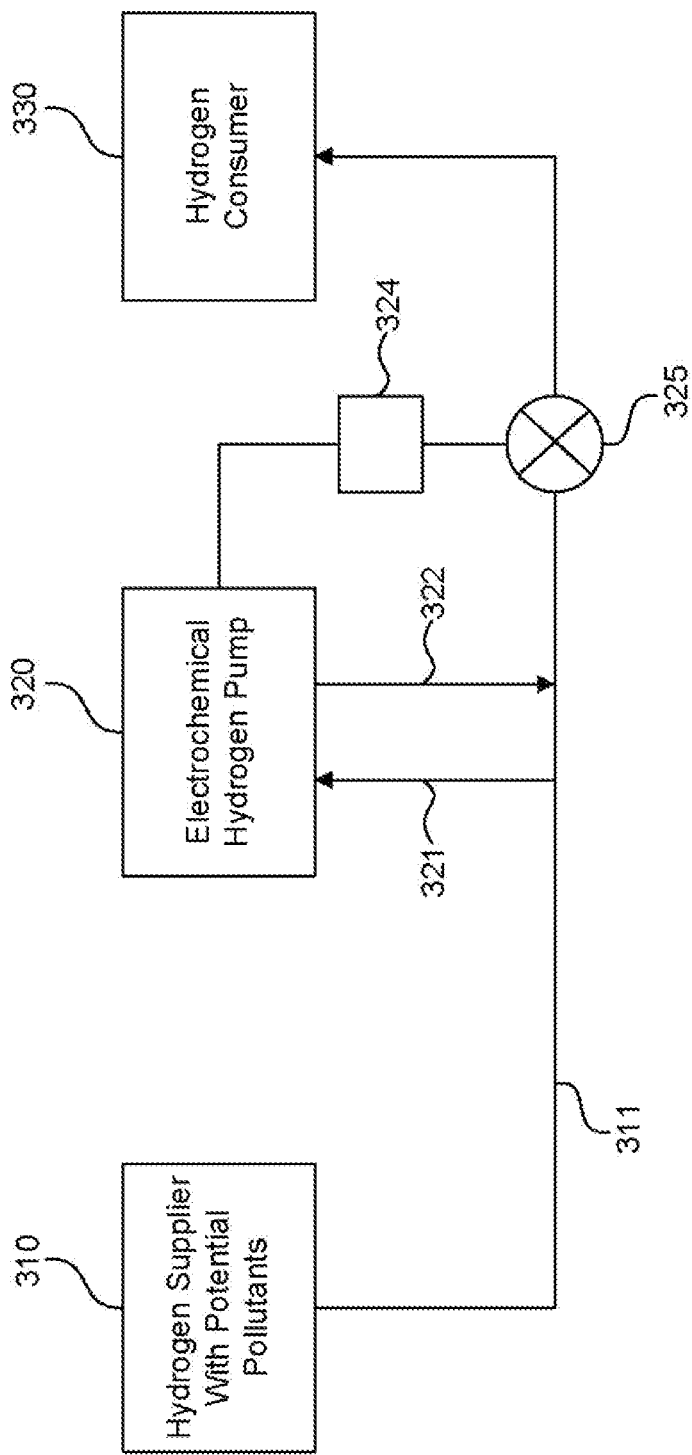
FIG. 3A illustrates an exemplary method for monitoring the purity of hydrogen gas, according to an embodiment of the present disclosure.

In another embodiment, an EHP may be used to monitor the purity of a quantity of hydrogen gas. As is shown in FIG. 3A, a supplier 310 may generate a quantity of hydrogen gas, which may contain one or more pollutants. The supply of hydrogen gas may be generated, for example, using any suitable steam-methane reformer, fossil hydrocarbon reformer, renewable hydrocarbon reformer, electrolyzer, ethanol reformer, biomass reformer, coal gasification, nuclear-powered water splitting, photoelectrochemical systems, photobiological systems, or solar thermochemical systems. In some embodiments, supplier 310 may already have a quantity of hydrogen gas or hydrogen liquid contained in any suitable container, for example, a tube, tank, pipeline, or bottle, and this hydrogen may have an unknown, suspected, or known admixture of pollutants.

The hydrogen gas may be delivered to a hydrogen consumer 330. To ensure purity of the hydrogen supply, a portion of the hydrogen gas with potential pollutants may be passed through an EHP 320, steps 311, 321. The portion of hydrogen gas may be passed through EHP 320 at any point following production, for example, immediately after production or after a period of storage time. Additionally, the portion of gas may be passed through EHP 320 before or during delivery of the hydrogen gas to consumer 330 and may be part of a random, regular, or continuous monitoring process. For example, in some embodiments, a supply line may be used to deliver hydrogen gas directly to consumer 330, and a portion of the gas may be re-directed to EHP 320 before and/or during delivery. In some embodiments, a portion of gas may be re-directed to EHP 320 while the hydrogen gas is being dispensed into a container before the gas is delivered to consumer 330. In still other embodiments, containers of gas intended for delivery to consumer 330 may be randomly sampled and sample portions of gas passed through EHP 320. In some embodiments, EHP 320 may be installed in a slip-stream of the hydrogen gas. As discussed above, EHP 320 includes an electrolyte membrane that allows only protons, i.e., hydrogen ions, and water molecules to pass through.

As is discussed above in regards to the embodiment of FIG. 2, only hydrogen and water molecules will be allowed to pass through from the anode side of EHP 320 to the cathode side of EHP 320. While the exemplary embodiment in FIG. 3 shows only one EHP, any suitable number of EHPs may be included.

For example, a plurality of EHPs could be arranged in parallel or in series to monitor hydrogen gas purity. Additionally, each EHP may include an individual electrochemical cell or a plurality of electrochemical cells arranged in a stack. In this configuration, the voltage required to operate EHP 320 used as a monitor may increase as pollutants build up on the anode side. The time between a purge of the anode and a specific level of voltage increase may be a function of or proportional to the quantity of pollutants. Calibration of the EHP monitor can be done ahead of time to detect a predetermined level of pollutants or may be done in-situ by providing the EHP monitor with a quantity of hydrogen of known purity level for comparison to the source stream.

After being passed through EHP 320, the hydrogen gas may be re-introduced to the supply of hydrogen gas to consumer 330, step 322. However, if pollutants are detected in the supply of hydrogen gas and/or if the purity level is determined to be below the predetermined threshold, then delivery of hydrogen gas to consumer 330 may be stopped, step 325. In some embodiments, e.g., those in which a supply line is used to deliver gas to consumer 330 or to a container for delivery to consumer 330, detection of pollutants in the hydrogen gas may stop the flow of hydrogen gas through the supply line. For example, one or more flow control valves may be included in the delivery system to control the flow of gas through the supply line. In some embodiments, a controller 324 may be included in the delivery system, and controller 324 may be configured to automatically stop delivery of gas (e.g., close the flow control valve) to consumer 330. In some embodiments, a signal may indicate to supplier 310 or consumer 330 that pollutants were detected, for example, a visual or audible signal. In some embodiments, the system may be manual, and supplier 310 may manually stop the supply of hydrogen to consumer 330 upon perceiving the signal.

After the monitoring process is complete or while the monitoring process is occurring, the hydrogen that has been monitored for purity may rejoin the supply of hydrogen gas and be delivered to hydrogen consumer 330, step 322. The hydrogen gas may be delivered to consumer 330 at any point following monitoring, for example, immediately after monitoring, during monitoring, or after a period of storage time, though reducing the time between monitoring and delivery may reduce the likelihood of recontamination.

Figure 3B:
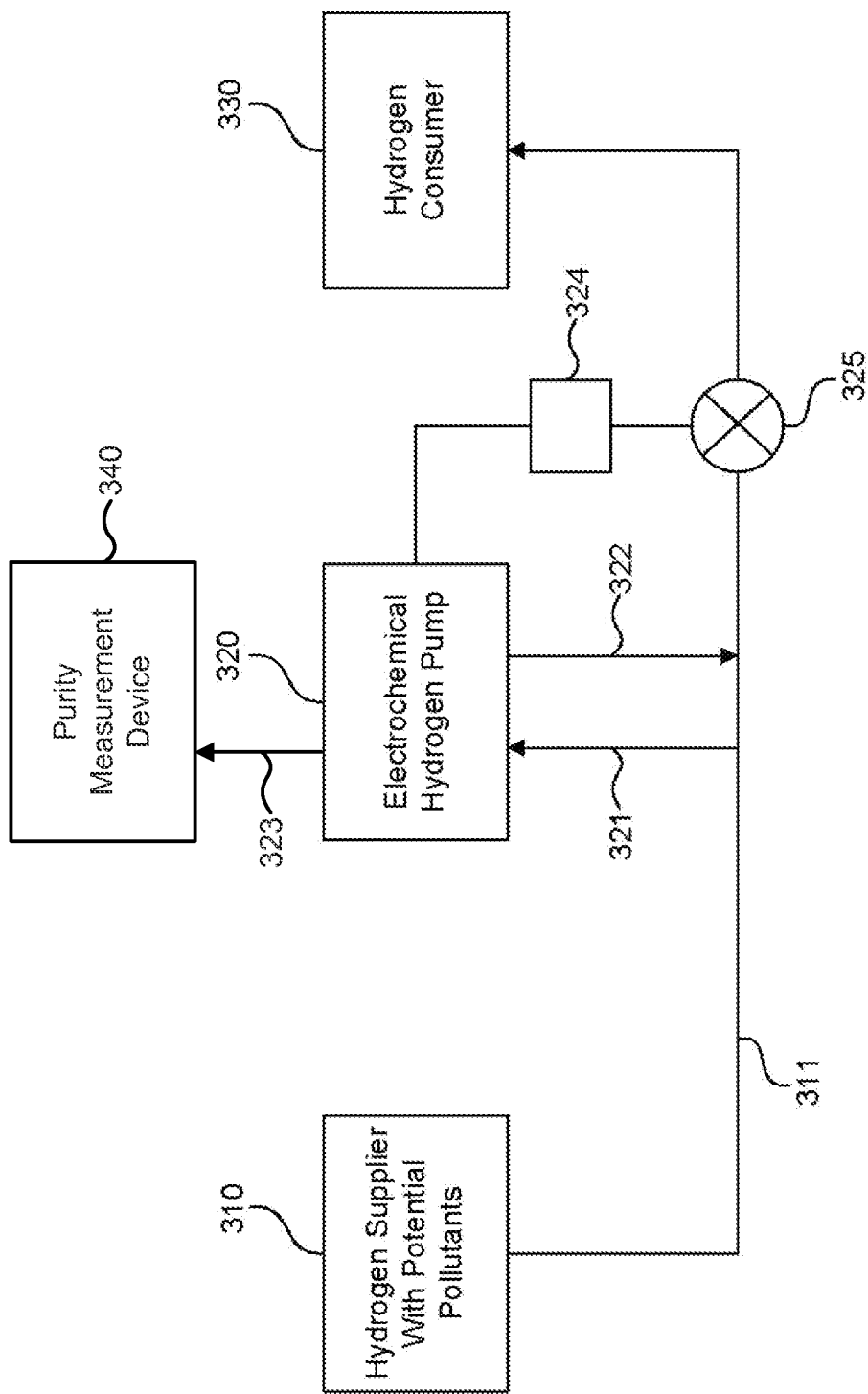
FIG. 3B illustrates an exemplary method for monitoring the purity of hydrogen gas, according to an embodiment of the present disclosure.

Another monitoring embodiment is shown in FIG. 3B. The embodiment of FIG. 3B may operate in a similar manner to that of FIG. 3A, except that a portion of the hydrogen gas with potential pollutants that is diverted to EHP 320 at step 321 may be sent to a purity measurement device 340 at step 323. In this embodiment, either all or some of the gas directed to EHP 320 at step 321 may be further directed to measurement device 340 via step 323. The gas sent to measurement device 340 may be sent to, but not through, EHP 320, or in some embodiments, the gas may be sent to measurement device 340 before or after the gas has passed through EHP 320. For example, the gas sent to measurement device 340 may be received from the cathode side after passing through EHP 320 and may contain a lower concentration of pollutants, or may be received from the anode side of EHP 320 without having passed through EHP 320 and may contain a higher concentration of pollutants relative to the cathode side.

Measurement device 340 may include any suitable device, including, for example, a gas chromatograph, mass spectrometer, infrared spectrometer, ion mobility spectrometer, surface acoustic wave sensor, optical spectrometer, or any suitable analysis instrument. Measurement device 340 may be configured to measure the purity of the hydrogen gas. For example, measurement device 340 may identify the components and relative amounts of those components present in the hydrogen gas, or measurement device 340 may measure only the amount of one or more specific pollutants that consumer 330 may be sensitive to, or measurement device 340 may identify the amount of hydrogen relative to all non-hydrogen pollutants present. Based on these measurements, measurement device 340 may be configured to determine the purity of the hydrogen gas.

Further, in some embodiments, the purity of the hydrogen gas with potential pollutants may be calculated based on the measurement taken by measurement device 340 and one or more parameters of EHP 320, e.g., current, voltage, pressure, temperature, gas flow speed, or any other suitable parameter. In some embodiments, this calculation may be performed, for example, by measurement device 340 or controller 324. Additionally, in some embodiments, measurement device 340 and/or the calculations used could be calibrated or adjusted based on one or more of these parameters. Accordingly, one or more additional measurement devices may be included in order to measure any suitable parameter of EHP 320, for example, a pressure gauge, thermometer, or other suitable device.

After the hydrogen gas is sent to measurement device 340 and a purity measurement is taken, the hydrogen gas may be passed through EHP 320 and/or re-introduced to the supply of hydrogen gas provided to consumer 330, step 322. In some embodiments, the gas sent to measurement device 340 may be purged or vented and may not be passed through EHP 320 or re-introduced to the supply of hydrogen gas provided to consumer 330.

In some embodiments, if measurement device 340 detects pollutants in the supply of hydrogen gas, or if it detects that the level of purity is below a predetermined threshold, then delivery of hydrogen gas to consumer 330 may be stopped, step 325. In some embodiments, e.g., those in which a supply line is used to deliver gas to consumer 330 or to a container for delivery to consumer 330, detection of pollutants in the hydrogen gas may stop the flow of hydrogen gas through the supply line. For example, one or more flow control valves may be included in the delivery system to control the flow of gas through the supply line. In some embodiments, a controller 324 may be included in the delivery system, and controller 324 may be configured to automatically stop delivery of gas (e.g., close the flow control valve) to consumer 330. For example, measurement device 340 may be operatively coupled, via, e.g., a wireless or hard connection, to controller 324 and may continuously or periodically communicate measurement readings to controller 324. In some embodiments, a signal may indicate to supplier 310 or consumer 330 that pollutants were detected, for example, a visual or audible signal. In some embodiments, the system may be manual, and supplier 310 may manually stop the supply of hydrogen to consumer 330 upon perceiving the signal. The embodiment of FIG. 3B may provide advantages over simply measuring the pollutants directly in the source stream of hydrogen. For example, if the hydrogen gas sent to measurement device 340 has already passed through EHP 320 and originated at the cathode side of EHP 320, the concentration of pollutants may be lower. Such a configuration may allow use of a less-sensitive measuring device, which may be less expensive, providing cost benefits. Accordingly, the monitoring of hydrogen gas purity using this configuration may be less expensive and easier to achieve than directly measuring the concentration of the hydrogen supply with potential pollutants prior to introduction to EHP 320.

Figure 4:
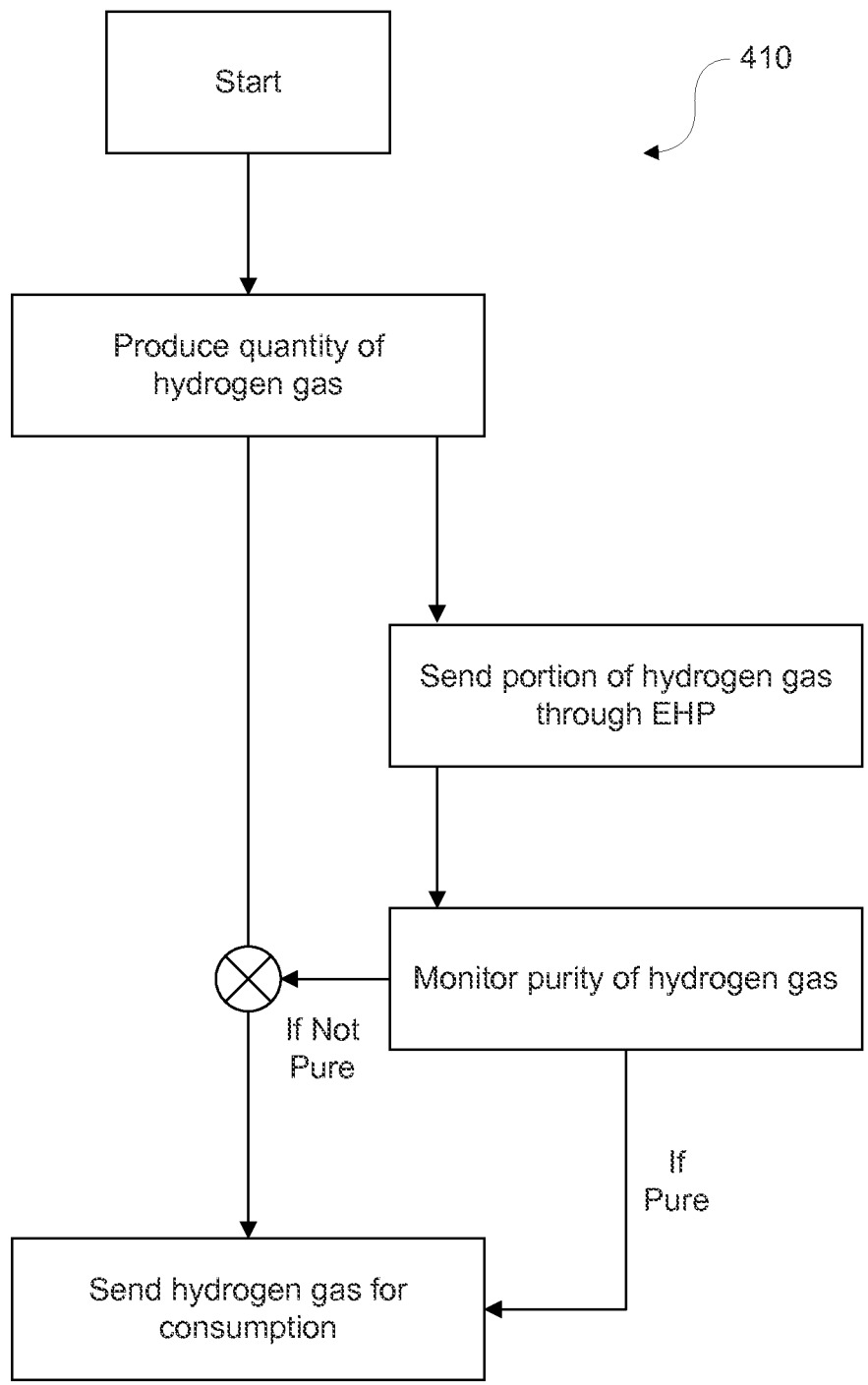
FIG. 4 illustrates an exemplary method for monitoring the purity of a quantity of hydrogen gas, according to an embodiment of the present disclosure.

The flow chart of FIG. 4 provides a visual arrangement of the steps of an exemplary monitoring method 410, similar to the exemplary embodiment described above in relation to FIGS. 3A, 3B.

The consumer may use the delivered hydrogen for any suitable use, including, e.g., for dispensing to fuel cell vehicles (e.g., at fueling or transfer stations), use with fuel cell vehicles, use with stationary fuel cell applications (e.g., back-up generators, home power systems), portable fuel cell applications, manufacturing (e.g., of semiconductors, electronics, metallurgy), or other commodity hydrogen gas users (e.g., laboratories, chemical synthesis). Suppliers of hydrogen gas may include mass-producers and wholesale distributors who supply to retail distributors (e.g., fueling or transfer stations), industrial and commodity manufacturers or users, or individual users of hydrogen. Consumers of hydrogen gas may include refineries of both fossil and renewable hydrocarbon fuels, refineries of both fossil and renewable hydrocarbon fuels, retail distributors, e.g., fueling stations, industrial manufacturers or users, or individual users of hydrogen. In some embodiments, the suppliers and the consumers may be the same entity, for example, a retailer or manufacturer may produce its own hydrogen gas for its own consumption.

In some embodiments, the supplier of hydrogen gas may use the above monitoring method to ensure that the hydrogen gas delivered to the consumer meets a predetermined threshold of purity. Such a threshold may be set by an industry standard, e.g., CGA-5.3, SAE J2719 and ISO 14687-2, or may be dictated at least in part by the needs of the consumer, or any other specifications, for example. Hydrogen purity levels may exceed 99% purity, and in some instances, may exceed 99.9% purity. Total impurities may be less than 400 parts per million, such as, for example, less than 300 parts per million, less than 200 parts per million, less than 100 parts per million, less than 50 parts per million, and less than 10 parts per million. In some embodiments, the supplier may use an EHP for hydrogen monitoring as a method of making certain guarantees or warranties, e.g., through contractual agreements or certificates, to the consumer about the level of purity of the delivered hydrogen. Accordingly, the method of using an EHP to monitor the purity of a quantity of hydrogen gas may provide a supplier with a cost-effective method, e.g., of contractually guaranteeing the purity of hydrogen gas delivered by a supplier to a consumer, or of producing and providing a supply of hydrogen gas that meets a predetermined threshold of purity.

Figure 5:
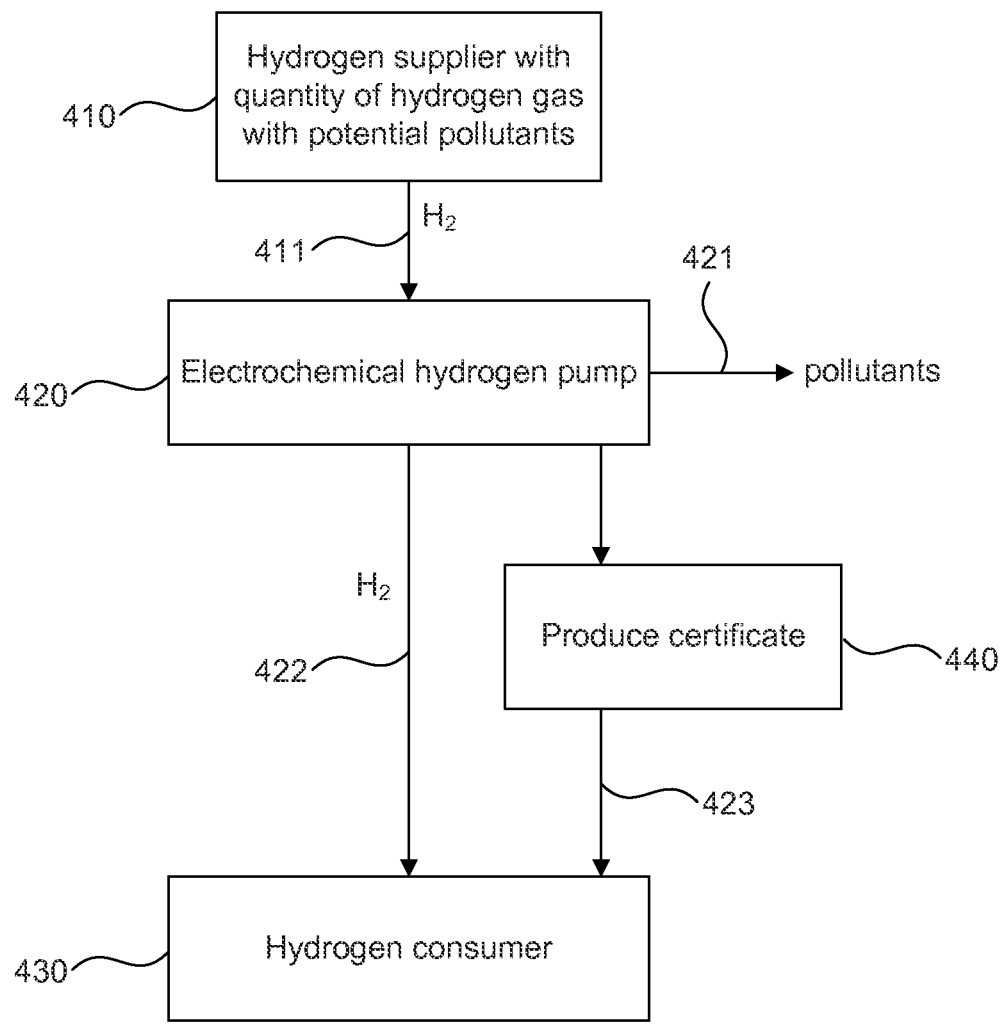
FIG. 5 illustrates a flow chart schematically depicting an exemplary purification or monitoring method, according to an embodiment of the present disclosure.

The method of FIG. 5 illustrates a flow chart of events that may occur with any suitable purification or monitoring system, for example, with those described in FIGS. 2A, 2B, 3 and 4. As is shown in step 410, a supplier may have a quantity of hydrogen gas. The quantity of hydrogen gas may be generated, for example, using any suitable steam-methane reformer, fossil hydrocarbon reformer, renewable hydrocarbon reformer, electrolyzer, ethanol reformer, biomass reformer, coal gasification, nuclear-powered water splitting, photoelectrochemical systems, photobiological systems, or solar thermochemical systems. In some embodiments, a supplier may already have a quantity of hydrogen gas or hydrogen liquid contained in any suitable container, for example, a tube, tank, pipeline, or bottle, and this hydrogen may have an unknown, suspected, or known admixture of pollutants.

To ensure purity of the hydrogen gas supplied to a consumer, some or all of the hydrogen gas with potential pollutants may be passed through an EHP, steps 411 and 420. As discussed above, the EHP includes an electrolyte membrane and is configured to allow only protons, i.e., hydrogen ions, and water molecules to pass through. Accordingly, only hydrogen and water will be allowed to pass through from the anode side of the EHP to the cathode side of the EHP. Any pollutants present in the gas admixture will be separated out and removed from the EHP, step 421. While the exemplary embodiment in FIG. 5 shows only one EHP, any suitable number of EHPs may be included. For example, a plurality of EHPs could be arranged in parallel or in series. Additionally, each EHP may include an individual electrochemical cell or a plurality of electrochemical cells arranged in a stack. By passing all or a portion of the quantity of hydrogen gas through the EHP, the quantity of hydrogen gas may be purified, monitored for purity, or both.

Once purified and/or monitored, the hydrogen gas may be ready for delivery to a consumer. Based on the monitoring and/or purification that occurred during step 420, the hydrogen supplier may produce a certificate, step 440. Such a certificate may include a certification of conformance, compliance, conformity, analysis, accuracy, or any other suitable certification or combination thereof. Exemplary certificates may certify or guarantee any suitable parameter, measurement, property, or quality (e.g., specialty or industrial) of a gas, for example, content (e.g., gas, moisture, or particle), certainty of composition, integrity, complexity, purity level, compliance with one or more standards or specifications. Further, the certificate could certify the method of blending, type of laboratory analysis and reference standard used to prepare the gas mixture, and expiration date, for example. In some embodiments, the supplier may use an EHP to make certain guarantees or warranties, e.g., through certificates or other contractual agreements, for example, at step 440, to the consumer about the purity level of the delivered hydrogen. Exemplary warranties may include any express, implied, written, oral, contingent, limited, full, or other suitable warranty. For example, the certificate produced at step 440 may certify that the hydrogen collected from the EHC and ready to provide to the consumer, or the hydrogen provided to the consumer, has a parameter, e.g., level of purity, that is at least substantially equal to a predetermined threshold of purity. The threshold of purity could be set, for example, according to any suitable specifications, industry standards, or the according to the needs of the consumer, for example.

The hydrogen supplier may then supply the hydrogen consumer with hydrogen gas of a certified purity, steps 422, 423, 430. Thy hydrogen supplier may physically provide the hydrogen consumer with a certificate, or such a certificate may be provided orally, or may be implied. The certificate may be incorporated as part of a written, express, implied, one-time, or ongoing contractual agreement between the hydrogen supplier and hydrogen consumer, and may include any suitable warranties, guarantees, or certifications. The certificate may be provided to the consumer before, during, or after delivery of the hydrogen gas, or, if an ongoing supply relationship exists between the supplier and the consumer, the certificate may be provided before, during, or after each delivery of hydrogen, all deliveries of hydrogen, or periodically over the course of ongoing hydrogen deliveries.

The consumer may use the delivered hydrogen for any suitable use, including, e.g., for dispensing to fuel cell vehicles (e.g., at fueling or transfer stations), use with fuel cell vehicles, use with stationary fuel cell applications (e.g., back-up generators, home power systems), portable fuel cell applications, manufacturing (e.g., of semiconductors, electronics, metallurgy), or other commodity hydrogen gas users (e.g., laboratories, chemical synthesis). Suppliers of hydrogen gas may include mass-producers and wholesale distributors who supply to retail distributors (e.g., fueling or transfer stations), industrial and commodity manufacturers or users, or individual users of hydrogen. Consumers of hydrogen gas may include refineries of both fossil and renewable hydrocarbon fuels, refineries of both fossil and renewable hydrocarbon fuels, retail distributors, e.g., fueling stations, industrial manufacturers or users, or individual users of hydrogen. In some embodiments, the suppliers and the consumers may be the same entity, for example, a retailer or manufacturer may produce its own hydrogen gas for its own consumption.

In some embodiments, the supplier of hydrogen gas may use the above method and certificate to ensure that the hydrogen gas delivered to the consumer meets a predetermined threshold of purity. Such a threshold may be set by an industry standard, e.g., CGA-5.3, SAE J2719 and ISO 14687-2, or may be dictated at least in part by the needs of the consumer, or any other specifications, for example. Hydrogen purity levels may exceed 99% purity, and in some instances, may exceed 99.9% purity. Total impurities may be less than 400 parts per million, such as, for example, less than 300 parts per million, less than 200 parts per million, less than 100 parts per million, less than 50 parts per million, and less than 10 parts per million. In some embodiments, the supplier may use an EHP for hydrogen monitoring as a method of making certain guarantees or warranties, e.g., through contractual agreements or certificates, to the consumer about the level of purity of the delivered hydrogen. Accordingly, the method of using an EHP to monitor the purity of a quantity of hydrogen gas may provide a supplier with a cost-effective method, e.g., of contractually guaranteeing the purity of hydrogen gas delivered by a supplier to a consumer, or of producing and providing a supply of hydrogen gas that meets a predetermined threshold of purity.

Application of embodiments described above may facilitate cost-effective purification, monitoring, quality control, and assurance of purity for hydrogen gas.

The many features and advantages of the present disclosure are apparent from the detailed specification, and thus, it is intended by the appended claims to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A method of producing hydrogen gas meeting a predetermined threshold of purity, comprising: transferring a quantity of a hydrogen gas mixture generated by a hydrogen supplier through an electrochemical hydrogen pump, wherein the hydrogen gas mixture has not previously been passed through any electrochemical cell, and wherein the electrochemical hydrogen pump includes an anode, a cathode, and an electrolyte membrane located between the anode and the cathode; separating a quantity of hydrogen gas from the hydrogen gas mixture by transferring the hydrogen gas from the anode, through the electrolyte membrane, to the cathode, wherein a voltage required to operate the pump increases as an amount of non-hydrogen substantially prevented from passing through the membrane increases; purging the anode of the non-hydrogen in the mixture that was prevented from passing through the membrane, wherein a controller controls timing of the purging based on a predetermined increase in the voltage required to operate the pump; collecting the hydrogen gas from the cathode, wherein the collected hydrogen gas at least meets the predetermined threshold of purity; and producing a full, written warranty that the collected hydrogen gas meets industry standard SAE J2719 and has a purity that is at least substantially equal to the predetermined threshold of purity, wherein the predetermined threshold of purity is at least 99%.

2. The method of claim 1, further comprising:
removing from the anode a quantity of non-hydrogen from the hydrogen gas mixture that the electrolyte membrane blocks from passing through the electrolyte membrane to the cathode.

3. The method of claim 1, further comprising:
delivering the collected hydrogen gas to a consumer.

4. The method of claim 1, wherein the predetermined threshold of purity is above approximately 99.9% hydrogen.

5. The method of claim 1, wherein the predetermined threshold of purity is less than approximately 300 parts per million of non-hydrogen.

6. The method of claim 1, wherein the predetermined threshold of purity is less than approximately 50 parts per million of non-hydrogen.

7. A method of providing hydrogen gas meeting a predetermined threshold of purity, comprising:
introducing a first quantity of hydrogen gas mixture containing hydrogen gas and non-hydrogen to an electrochemical hydrogen pump, wherein the electrochemical hydrogen pump includes an anode, a cathode, and an electrolyte membrane located between the anode and the cathode;
directing the hydrogen gas mixture from the anode to the electrolyte membrane;
passing the hydrogen gas through the electrolyte membrane to the cathode;
substantially preventing the non-hydrogen from passing through the electrolyte membrane;
collecting the hydrogen gas from the cathode, wherein the collected hydrogen gas at least meets the predetermined threshold of purity;
mixing the collected hydrogen gas with a second quantity of hydrogen gas mixture, wherein the second quality of hydrogen gas mixture has not previously been passed through any electrochemical cell, and wherein the mixing produces a third quantity of hydrogen gas mixture with a level of purity that at least meets the predetermined threshold of purity; and
providing at least one of a certificate of conformance, a guarantee or a warranty that the third quantity of hydrogen gas mixture has a purity that is at least substantially equal to the predetermined threshold of purity.

8. The method of claim 7, further comprising:
delivering the third quantity of hydrogen gas to a consumer.

9. The method of claim 7, wherein the first quantity of hydrogen gas mixture and the second quantity of hydrogen gas mixture are both initially derived from a hydrogen gas mixture source received from a hydrogen supplier, and wherein the first quantity and the second quantity are separated when the first quantity is introduced to the electrochemical hydrogen pump, and the first quantity and the second quantity are rejoined by the mixing.

10. The method of claim 7, wherein the collected hydrogen gas is mixed with the second quantity of hydrogen gas mixture, and the non-hydrogen gas substantially prevented from passing through the electrolyte membrane is not mixed with the second quantity of hydrogen gas mixture.

11. The method of claim 10, wherein the collected hydrogen gas mixed with the second quantity of hydrogen gas mixture is delivered to a consumer.

12. The method of claim 7, wherein the predetermined threshold of purity is above approximately 99.9% hydrogen.

13. The method of claim 7, wherein the electrochemical hydrogen pump is configured to operate at a pressure of above approximately 2,000 psi.

14. The method of claim 7, wherein the electrochemical hydrogen pump is configured to operate at a pressure of above approximately 5,000 psi.

15. The method of claim 7, wherein the electrochemical hydrogen pump is configured to operate at a pressure of above approximately 10,000 psi.

16. A method of providing hydrogen gas meeting a predetermined threshold of purity, comprising:
receiving a quantity of hydrogen gas from a source;
dividing the quantity of hydrogen gas into a first portion and a second portion;
diverting the first portion of the quantity of hydrogen gas to an electrochemical hydrogen pump, wherein the electrochemical hydrogen pump includes an anode, a cathode, and an electrolyte membrane located between the anode and the cathode;
directing the first portion of hydrogen gas from the anode, to the electrolyte membrane;
passing the first portion of hydrogen gas through the electrolyte membrane to the cathode;
substantially preventing non-hydrogen in the first portion from passing through the electrolyte membrane;
reintroducing the first portion of hydrogen gas passed through the electrolyte membrane to the second portion of hydrogen gas not diverted to the electrochemical hydrogen pump, wherein the second portion of hydrogen gas has not previously been passed through any electrochemical cell; and
providing at least one of a certificate, a guarantee, or a warranty that the first portion and the second portion of hydrogen gas have a purity that is at least substantially equal to the predetermined threshold of purity.

17. The method of claim 16, wherein a voltage required to operate the electrochemical hydrogen pump increases as the amount of non-hydrogen substantially prevented from passing through the electrolyte membrane increases, and wherein the method further comprises purging the anode of the non-hydrogen in the first portion that was prevented from passing through the electrolyte membrane, wherein a controller controls timing of the purging based on a predetermined increase in the voltage required to operate the electrochemical hydrogen pump.

18. The method of claim 16, further comprising:
delivering the first portion of hydrogen gas passed through the electrolyte membrane and the second portion of hydrogen gas not diverted to the electrochemical hydrogen pump to a consumer.

19. The method of claim 18, wherein the electrochemical hydrogen pump further includes a controller and the method further comprises:
stopping the delivery of hydrogen gas to the consumer if the controller detects that the first portion of hydrogen gas diverted to the electrochemical hydrogen pump falls below a predetermined level of purity.

20. The method of claim 16, further comprising:
sending an amount of the first portion of the quantity of hydrogen gas to a measurement device, wherein the measurement device is configured to measure a purity level of the hydrogen gas.

21. The method of claim 20, wherein the amount of the first portion is sent from the cathode of the electrochemical hydrogen pump to the measurement device.

22. The method of claim 16, wherein the electrochemical hydrogen pump is configured to operate at a pressure of above approximately 2,000 psi.

23. The method of claim 16, wherein the electrochemical hydrogen pump is configured to operate at a pressure of above approximately 5,000 psi.

24. The method of claim 16, wherein the electrochemical hydrogen pump is configured to operate at a pressure of above approximately 10,000 psi.

25. A method of providing hydrogen gas meeting a predetermined threshold of purity, comprising: introducing a quantity of hydrogen gas mixture containing hydrogen gas and non-hydrogen gas to an electrochemical hydrogen pump, wherein the hydrogen gas mixture was generated by a hydrogen supplier, wherein the hydrogen gas mixture has not previously been passed through an electrochemical cell, and wherein the electrochemical hydrogen pump includes an anode, a cathode, and an electrolyte membrane located between the anode and the cathode; directing the hydrogen gas mixture from the anode to the electrolyte membrane; passing the hydrogen gas through the electrolyte membrane to the cathode; substantially preventing the non-hydrogen gas from passing through the electrolyte membrane, wherein a voltage required to operate the pump increases as an amount of non-hydrogen substantially prevented from passing through the membrane increases; purging the anode of the non-hydrogen in the mixture that was prevented from passing through the membrane, wherein a controller controls timing of the purging based on a predetermined increase in the voltage required to operate the pump; collecting the hydrogen gas from the cathode, wherein the collected hydrogen gas at least meets the predetermined threshold of purity; and providing at least one of a certificate, a guarantee, or a warranty that the collected hydrogen gas has a purity that is at least substantially equal to the predetermined threshold of purity.

26. The method of claim 25, wherein the electrochemical hydrogen pump is configured to operate at a pressure of above approximately 5,000 psi.

27. The method of claim 25, wherein the electrochemical hydrogen pump is configured to operate at a pressure of above approximately 10,000 psi.

28. The method of claim 1, wherein the hydrogen supplier generated the hydrogen gas mixture using at least one of a steam-methane reformer, fossil hydrocarbon reformer, renewable hydrocarbon reformer, electrolyzer, ethanol reformer, biomass reformer, coal gasification, nuclear-powered water splitting system, photoelectrochemical system, photobiological system, or solar thermochemical system.

29. The method of claim 1, wherein a second portion of the hydrogen gas mixture is not transferred through the electrochemical hydrogen pump.

30. The method of claim 7, wherein a voltage required to operate the electrochemical hydrogen pump increases as the amount of non-hydrogen substantially prevented from passing through the electrolyte membrane increases, and wherein the method further comprises varying an amount of hydrogen gas in at least one of the first quantity or the second quantity in response to an increase in the voltage required to operate the electrochemical hydrogen pump.

31. The method of claim 16, wherein the source is a hydrogen supplier that generates the quantity of hydrogen gas using at least one of a steam-methane reformer, fossil hydrocarbon reformer, renewable hydrocarbon reformer, electrolyzer, ethanol reformer, biomass reformer, coal gasification, nuclear-powered water splitting system, photoelectrochemical system, photobiological system, or solar thermochemical system.

32. A method of producing hydrogen gas meeting a predetermined threshold of purity, comprising: transferring a quantity of a hydrogen gas mixture generated by a hydrogen supplier through an electrochemical hydrogen pump, wherein the hydrogen gas mixture has not previously been passed through an electrochemical cell, and wherein the electrochemical hydrogen pump includes an anode, a cathode, and an electrolyte membrane located between the anode and the cathode; separating a quantity of hydrogen gas from the hydrogen gas mixture by transferring the hydrogen gas from the anode, through the electrolyte membrane, to the cathode, wherein a voltage required to operate the pump increases as an amount of non-hydrogen substantially prevented from passing through the membrane increases; purging the anode of the non-hydrogen in the mixture that was prevented from passing through the membrane, wherein a controller controls timing of the purging based on a predetermined increase in the voltage required to operate the pump; collecting the hydrogen gas from the cathode, wherein the collected hydrogen gas at least meets the predetermined threshold of purity; and producing at least one of a certificate, a guarantee, or a warranty that the collected hydrogen gas has a purity that is at least substantially equal to the predetermined threshold of purity.

* * * * *

UNITED STATES PATENT AND TRADEMARK OFFICE
CERTIFICATE OF CORRECTION

PATENT NO.        : 9,186,624 B2
APPLICATION NO.   : 13/972715
DATED             : November 17, 2015
INVENTOR(S)       : Scott Blanchet Page 1 of 1

It is certified that error appears in the above-identified patent and that said Letters Patent is hereby corrected as shown below:

In The Claims

Claim 7, column 14, line 45, "second quality of" should read --second quantity of--.

Signed and Sealed this
Fifth Day of April, 2016

Michelle K. Lee
*Director of the United States Patent and Trademark Office*